May 8, 1973    J. L. AMOS ET AL    3,732,345
METHOD FOR THE INCORPORATION OF FILAMENTARY
MATERIAL IN A RESINOUS MATRIX
Original Filed Jan. 7, 1966    2 Sheets-Sheet 1

INVENTORS.
James L. Amos
Arnett L. Bird
BY Robert P. Snyder

AGENT

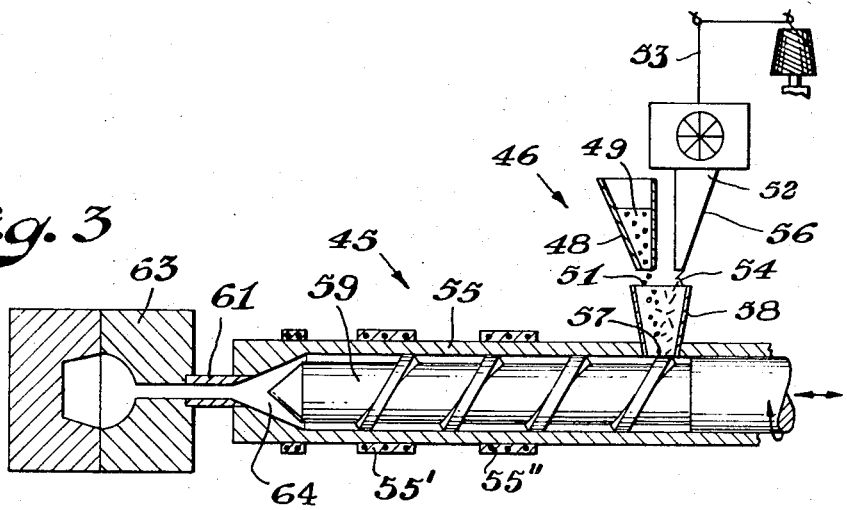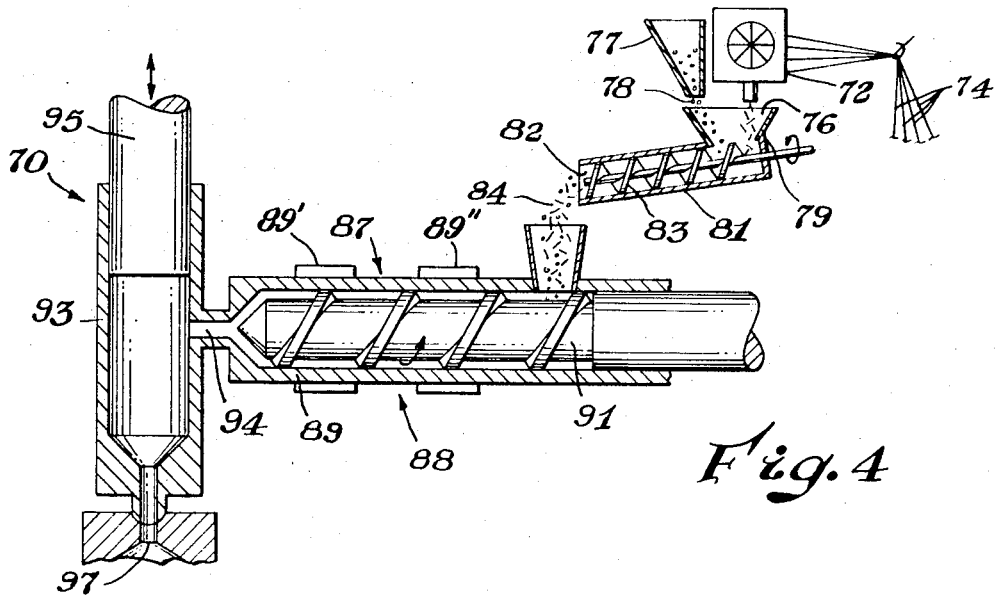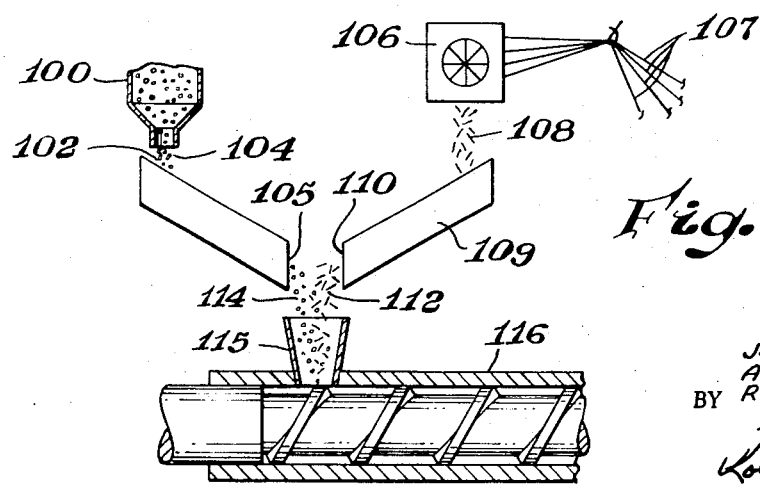

United States Patent Office 3,732,345
Patented May 8, 1973

3,732,345
METHOD FOR THE INCORPORATION OF FILAMENTARY MATERIAL IN A RESINOUS MATRIX
James L. Amos, Midland, and Arnett L. Bird and Robert P. Snyder, Saginaw, Mich., assignors to The Dow Chemical Company, Midland, Mich.
Continuation of application Ser. No. 532,819, Jan. 7, 1966, which is a continuation-in-part of application Ser. No. 342,659, Feb. 5, 1964, which in turn is a continuation-in-part of application Ser. No. 302,504, Aug. 16, 1963. This application Apr. 16, 1970, Ser. No. 29,095
Int. Cl. B29f 1/02, 3/02; C08f 45/10
U.S. Cl. 264—329   28 Claims

ABSTRACT OF THE DISCLOSURE

Glass reinforced thermoplastics are formed by directly adding chopped filaments and particulate thermoplastic resin to heat fabricating apparatus such as an extruder or pre-plasticizing injection molding machine under non-stratifying conditions to provide a glass reinforced molded article.

---

This application is a continuing application of our co-pending application Ser. No. 532,819, filed Jan. 7, 1966, now abandoned, which in turn is a continuation-in-part of application Ser. No. 342,659, filed Feb. 5, 1964, now abandoned, which in turn is a continuation-in-part of our earlier filed application Ser. No. 302,504, filed Aug. 16, 1963, now abandoned.

This invention relates to a method for the incorporation of filamentary material into a thermoplastic resinous matrix, and more particularly relates to an improved method of fabricating articles containing filamentary reinforcing embedded in a resinous matrix.

A wide variety of methods and techniques have been utilized in the past for incorporating filaments of various types in plastics which may be heat formed. Among these are the impregnation of a glass mat with a thermoplastic resinous material, subsequent chopping of the impregnated mat and molding or otherwise heat forming of the resultant product. Other techniques which have been used include the technique of passing a roving of the filamentary material through a bath containing a solution or a hot melt of the resinous material, subsequently drying or cooling the coated impregnated filament, then chopping it into granules suitable for heat forming. These techniques are reatlively costly and are not well adapted to large scale production without the use of relatively bulky and complicated equipment as well as a relatively high labor cost.

An alternate technique which is found to be more economical comprises adding a chopped harl, roving or staple fiber or filament to a dry blending apparatus together with an appropriate quantity of finely divided particulate thermoplastic material. This method suffers from such defects as stratification, or concentration; that is, such a blend on being subjected to vibration or on being moved from place to place tends to form regions within the container which contain more or less of the filamentary reinforcing material.

It is an object of this invention to provide an improved method of incorporating filamentary reinforcing agent into a thermoplastic resinous matrix.

Another object of the invention is to provide an improved method of blending glass fiber reinforcement with thermoplastic resinous particles to provide an article having a maximum fiber length therein.

A further object of the invention is to provide a means of closely regulating the relative quantities of thermoplastic resinous material and the fiber reinforcing material within a mixture.

These benefits and other advantages in accordance with the invention are readily achieved by fabricating a filament reinforced resinous object comprising contacting (a) a stream of finely divided particulate resinous material which may be formed by the application of heat and pressure with (b) a stream of a filamentary reinforcing agent to form a composite stream wherein the filamentary agent and the resinous material are in close contact with each other, the proportion of reinforcing agent and resinous material being such that on heat plastification the mixture is extrudable, then heat plastifying the particulate synthetic thermoplastic resinous material and mechanically mixing it with the filamentary reinforcing agent, and heat fabricating the combined stream without subjecting it to stratification conditions.

Further features, benefits and advantages of the present invention will become more apparent when the following specification is considered in view of the drawing wherein:

FIG. 3 is a schematic representation of an alternate method of feeding the heat fabricating apparatus.

FIG. 4 depicts schematically an alternate heat fabricating apparatus for the practice of the invention.

FIG. 5 depicts an alternate technique for the practice of the invention.

Figure 1:
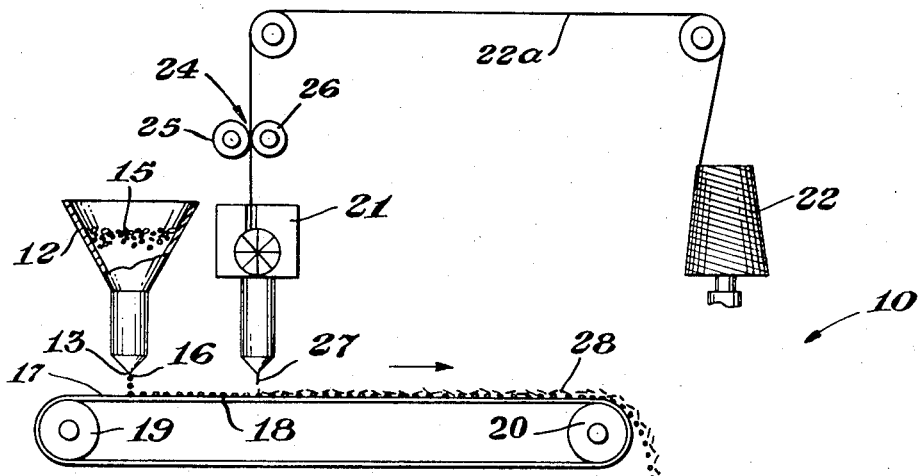
FIG. 1 is a schematic representation of the practice of the method of the invention.

In FIG. 1 there is illustrated a plastic fabrication apparatus generally designated by the reference numeral 10 which may be utilized to show the method of the invention. The apparatus 10 comprises in cooperative combination a supply means 12 having a discharge port 13. Disposed within the supply means 12 is a quantity of particulate thermoplastic resinous material 15. The material 15 is delivered through the discharge port 13 in a stream or layer 16 onto the surface of a belt 17. The belt 17 is supported and driven by the pulleys 19 and 20 in the direction indicated by the arrow. Generally adjacent the resin supply means 12 is positioned a chopper or comminuting device 21. In cooperative combination with the chopping device 21 is a harl or roving supply 22 which delivers a roving 22a to a roving feed means 24. The term "harl" as employed herein refers to an elongated filamentary material adapted to be supplied in the form of rolls, spools, coils, skeins, and bundles, which on chopping to lengths of from about ¼ inch to 1 inch, provides individual fibers or fiber bundles of generally parallel fibers. Typical examples of harl are roving, yarns having about 1 or fewer twists per chopped length, tapes, mats, tows and the like. The roving feed means comprises a pair of driven rolls 25 and 26. The chopper 21 delivers a stream or layer of chopped filaments or short fibers 27 to the belt 17 upon which there is formed a layer 18 of particulate resinous material 15. The stream of fibers 27 forms a second layer 28. The layers 18 and 28 are thin; that is, the thickness of the layer 18 does not exceed five particle diameters or thicknesses, whereas the layer 28 has a thickness proportionate to the quantity of resinous material present in the layer 18. As the belt 17 moves in the direction of the arrow, the combined layer 18 and 28 is discharged into a supply source or receiver 31 of a heat forming apparatus 32 which fabricates the mixture of resin and filamentary reinforcing material into the shaped article 33.

Figure 2:
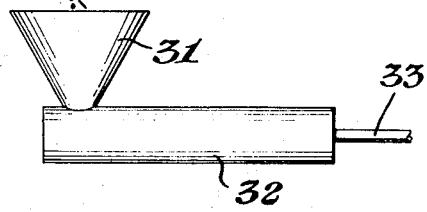
FIG. 2 depicts an alternate embodiment thereof.
Figure 2:
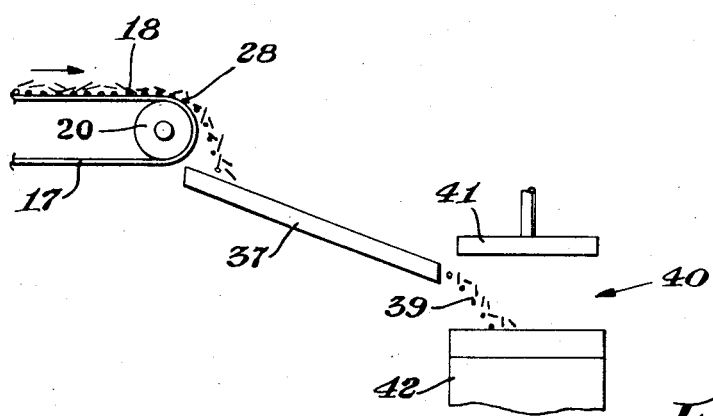

In FIG. 2 there is illustrated an alternate arrangement of the invention wherein a trough 37 is provided adjacent the discharge end of the belt 17 and the trough directs the stream of thermoplastic resinous material and chopped filamentary reinforcing material 39 to a compression molding apparatus 40 comprising a first heated die 41 and a second heated die 42. For the sake of clarity, the associated operating mechanisms have been omitted.

In FIG. 3 there is illustrated an alternate arrangement of the invention comprising a heat fabricating apparatus generally designated by the reference numeral 45 and a feed arrangement generally designated by the reference numeral 46. The feed arrangement 46 comprises a hopper or granular resin supply 48 having contained therein a granular or particulate thermoplastic resin 49. The hopper 48 discharges a stream or layer 51 of the thermoplastic resinous material 49. A chopper or comminuting device 52 is positioned generally adjacent the hopper 48. In the comminuting device 52 is supplied a roving 53. The roving 53 is discharged as a stream or layer of chopped filaments 54 from a chute or guide 56. The heat fabricating apparatus 45 is of the variety known as a screw injection machine and comprises a barrel 55 having heating means 55' and 55'', the barrel having defined therein a barrel cavity or heating zone 64 and a feed port 57. A hopper 58 is provided adjacent the feed port 57. Disposed within the cavity 64 is a reciprocating screw 59. A nozzle 61 is disposed adjacent the end of the barrel 55 remote from the feed port 57. The nozzle 61 is in communication with a mold 63. In operation of the embodiment of FIG. 3 the resin stream 51 and the chopped fibers 54 are fed directly to the hopper 58 and fall into the cavity 64 where the resinous material is heat plastified and subsequently discharged into the mold.

In FIG. 4 there is illustrated an alternate embodiment of the invention designated by the reference numeral 70. The embodiment 70 comprises a chopper or comminuting device 72 being supplied with a plurality of rovings 74 which are discharged from the chopper as a stream of filaments 76. Generally adjacent the chopper 72 is positioned a resin supply 77 which discharges a stream of particulate thermoplastic resin 78. A hopper 79 is positioned generally beneath the chopped filaments 76 and the resin 78. A mixing device 81 is in operative communication with the hopper 79. The mixing device 81 comprises a channel or passageway 82 having contained therein a rotating blending forwarding flight screw 83. A blend 84 of resin and chopped filaments is discharged from the end of the blender mixer 81 remote from the hopper 79. The blend is discharged into a heat fabricating device 87. The heat fabricating device 87 comprises a preplasticizing extrusion section 88 comprising a heated barrel 89 having heating means 89' and 89'', the barrel having contained therein a screw 91. An injection cylinder 93 is in operative communication with the barrel 89 by means of the port 94. An injection piston or ram 95 is disposed within the cylinder 93. The injection cylinder 93 discharges into a mold 97. In the operation of the apparatus of FIG. 4, a resin and chopped roving is discharged into a continuous conveying and blending apparatus such as the mixer 81 and is directly discharged into the screw preplasticizer 88 where it is heat plastified and subsequently extruded into the injection cylinder 93.

In FIG. 5 there is depicted a schematic representation of an alternate method in accordance with the present invention wherein a resin supply means 100 is positioned adjacent a resin transport means or trough 102. A stream or layer 104 of particulate thermoplastic resinous material is discharged into the trough 102 and conveyed to a discharge end 105 thereof. A comminuting device 106 is positioned generally adjacent the resin supply 100. A comminuting device or chopper is supplied with a plurality of roving 107. The roving 107 is discharged from the comminuting device 106 as a stream of chopped filaments 108. A filament conveying means or trough 109 is positioned adjacent the chopper 106 and is adapted to receive the chopped filaments 108. The hopper 109 has a discharge end 110 generally adjacent the discharge end 105 of the resin trough 102. A flowing stream or layer 112 of chopped filaments 108 issues from the trough 109. A falling stream or layer 114 of thermoplastic resinous material issues from the trough 102. The discharge portions 105 of the trough 102 and 110 of the trough 109 are so positioned that the streams 112 and 114 flow together and intermesh while falling into a hopper 115 disposed on a heat fabricating apparatus 116.

In operation of the embodiment of FIG. 5, the resin supply provides a predetermined quantity of resin to the trough 102 whereas a predetermined quantity of chopped filament is provided to the trough 109. The falling layers of chopped filament and particulate resin are so positioned that while falling they intermingle or contact and the resultant combined stream is processed almost immediately by the heat fabricating device.

It is essential and critical to the operation of the embodiments of the present invention illustrated in FIGS. 1 and 2 that the thermoplastic resinous material be supplied in the form of layers, such as depicted in the drawing. By utilizing a continuous or intermittent supply of such layers, a uniform composition is provided to the heat forming apparatus and stratification or clumping does not occur as in the case of the conventional techniques.

The embodiment of the invention illustrated in FIG. 3 utilizes the same basic principle of the embodiments of FIGS. 1 and 2 with the exception that the thin layers are formed when the flowing streams engage the screw. Thus, the thermoplastic resin mixed with the filamentary material is heat plastified in what can be visualized as thin layers being wrapped about and forwarded by the screw of the extrusion machine. Preferably in the practice of the invention, the inventory of the mixed filamentary and particulate resinous material in the hopper of the heat fabricating machine should be maintained at a value sufficiently low that stratification or separation of the two materials does not occur. Thus, in the most beneficial mode of operation little or no opportunity is given to the feed material to stratify or gather together in small balls or clumps. Some material may be retained in the hopper provided the quantity is insufficient and the machine vibration is insufficient to cause objectionable stratification before the material is advanced through the extrusion machine.

The embodiment of the invention illustrated in FIG. 4 is particularly advantageous in processing locations where the quantity of resin and filament required by the apparatus is large and the vertical height available for equipment installation is at a minimum. The resin and chopped filament provided to the mixing device 81 are placed in the hopper of the mixing device at a rate equal to or less than the rate of takeaway of the flight screw. The rate of travel of the material conveyed by the flight screw is maintained high relative to the stratification rate of the mixture. Thus, the discharge stream 84 is maintained at a generally constant level and the material removed from the hopper of the heat fabricating apparatus generally in accordance with the requiremetns of the embodiment of FIG. 3.

The embodiment of FIG. 5 depicts a particularly advantageous feed system wherein large quantities of materials are being handled. The streams of particulate material are discharged from the troughs and the streams spread as they fall through the air by placing the resin trough and the fiber trough in appropriate relationship depending upon the particulate materials utilized. The dispersed or spread out streams will intermingle to provide intimate admixture of the particulate resinous material and the fibers.

The method of the invention may be practiced with any thermoplastic resinous material which is heat formable and benefits from the incorporation of filamentary reinforcing material.

Typical resinous materials which may be utilized include the alkenyl aromatic resins typified by polystyrene, styrene copolymers and blends and graft copolymers of styrene and rubber and the like. The invention is readily practiced utilizing polyvinyl chloride, vinylidene chloride copolymers such as are generally known as sarans; superpolyamides such as nylon 66 (a condensation product of hexamethylene diamine and adipic acid); the polyolefins including polyethylene, polypropylene and resinous copolymers thereof, ethyl cellulose, cellulose acetate, rubbers both natural and synthetic including polybutadiene, polyisoprene including the chlorinated derivatives, mixtures thereof and the like. Beneficially, in order to achieve uniform dispersion of the filamentary reinforcing agents within the resinous material it is desirable that the resinous material be in a particulate form. Generally, the resinous material may have an average particle size of from a fine powder to granules which are about ⅛ inch in diameter and ⅛ inch in length. However, preferably, the particulate resinous material is a material which will pass through a 40 mesh U.S. Sieve Size Screen. Advantageously, all of such material is retained on a 200 mesh U.S. Sieve Size Screen. Resinous materials more finely divided than that which is retained on a 200 mesh screen is oftentimes difficult to handle, subject to dusting and expensive to prepare.

A wide variety of filamentary reinforcing agents may be utilized, including certain thermoplastic materials when utilized with other resinous materials which have a significantly lower heat forming temperature than does the reinforcing material. Particularly advantageous and beneficial are the thermoplastic resinous compositions utilizing filamentary glass or Fiberglas as a reinforcing medium.

It is essential and critical to the operation of the embodiments of the present invention illustrated in FIGS. 1 and 2 that the materials be first formed in the form of layers in contact with each other and subsequently added to the supply of the heat forming equipment. Advantageously, such a supply should be maintained at a minimal volume, otherwise a minor degree of stratification may occur due to the vibration of the heat fabricating apparatus. Most advantageously, where the discharge of the layers is close to the feed port of the heat fabricating device, the particulate thermoplastic resinous layer should be maintained at a thickness approaching one particle diameter; by particle diameter is meant the major dimension exhibited by a particle of the thermoplastic material in a direction normal to a plane upon which the particle is resting.

It is essential and critical to the embodiments illustrated in FIGS. 3, 4 and 5 that the particulated resin-filament mixture be removed from the hopper at a rate equal to or greater than the rate of supply. Thus, in all of the embodiments of the invention, the resin and chopped filamentary materials are conveyed to the zone of heat plastification as rapidly as possible once they have been combined.

The method of the invention is found to be satisfactory when the thermoplastic resinous layer has a thickness of from about 2 to about 5 particle diameters. However, if the thickness is increased beyond this figure, oftentimes the uniformity of the resultant product may be somewhat less than desired. As is readily understood by anyone skilled in the art, the desired degree of uniformity is a matter primarily dependent upon the characteristics desired in the resultant product. Oftentimes where less than the most uniform degree of dispersion is satisfactory, a thicker layer may be utilized. As the layers of material travel greater distances such as by falling through the air, the thickness of the layers may be increased without losing the uniformity. Similarly, as the weight or size of the product of the heat fabricating apparatus is increased, thicker layers may be utilized. If desired, almost any number of alternating layers of resin-filament may be employed for the desired degree of blending.

Although in FIG. 1 there is illustrated a moving belt passing under a hopper and a chopper to form the reinforcing and the resin layer, other techniques may be readily employed, such as the use of a vibratory feeder which may replace the belt. It is particularly advantageous to continuously supply the reinforcing material to the apparatus in the form of a roving. The roving is readily handled by conventional textile techniques until it is discharged from the chopper, at which time it is dropped directly onto the conveying means. Thus, it is unnecessary to handle and transfer the chopped filamentary reinforcing material for any great distance or to handle it in bulk. By enclosing the chopper resin feed and hopper, considerable savings are found in cleanliness and health. Further, a considerable economic advantage occurs from the use of a roving. Such a feeder eliminates bulky handling equipment and the health hazards often associated therewith. By varying the feed rates of either the resin or the reinforcing agent or even both, a desired ratio of reinforcing material to resinous matrix in the final product is readily obtained. By utilizing conventional control mechanisms, the ratio of reinforcing agent to resinous material may be varied within a single piece if the operation is an intermittent molding operation, such as injection molding or the like. This technique may also be employed with complex moldings where, for example, it may be desirable to have a high proportion of reinforcement in the portion of the object being formed which is prepared from the material initially fed to the mold for a particular purpose, such as surface impact resistance, abrasion or the like.

In utilizing the method of the present invention, many of the difficulties frequently encountered in handling filamentary reinforced thermoplastic materials are overcome. For example, blending of particulate thermoplastic resinous materials is such that an excellent dispersion is obtained and the composition of the product is uniform, whereas blends of the filamentary material with the particulate resin tend to form filamentary aggregates or clumps which are not readily separated. The invention also provides a maximum flexibility of formulation which can be varied quickly and easily and permits the addition of other adhesives, such as fillers, dyes, pigments, lubricants and sizing agents, by means of a third or a fourth, or even a fifth, stream of additaments either to the layer or to the hopper or supply chamber of the forming apparatus.

Automation is readily achieved because of the simplicity of the method. It is particularly versatile in that even B stage thermosetting resins may be utilized. By the term "B stage" is meant a thermosetting resin which is solid and may be heat fabricated in a manner similar to a thermoplastic resin prior to becoming fully cross-linked into a thermoset material.

By way of further illustration, a plurality of shaped articles was prepared by injection molding a blend of a copolymer of 72 parts of styrene and 28 parts of acrylonitrile. The polymeric material was in granular form and passed a 40 mesh U.S. Sieve Size Screen and was retained on a 200 mesh U.S. Sieve size screen. A feed arrangement substantially as illustrated in FIG. 1 was employed. A glass roving comprising about 16,000 individual filaments having diameters ranging between 0.0003 and 0.0004 inch was utilized. An Ankerwerke screw injection machine having an 8 ounce capacity cylinder was utilized. The feed apparatus was operated intermittently to provide adequate material for each shot. The overall feed rate for the resinous material was about 15 pounds per hour and the glass was fed at an overall rate of about 4.5 pounds per hour. The overall cycle time for each operation was about 50 seconds. The cylinder temperature was 475° F. and an injection pressure of about 9000 pounds per square inch was used. An H shaped complex mold cavity was utilized wherein two 6 x 1 inch test bars were prepared as well as a disc and a rectangle. The molded parts appeared uniform and on removal of the thermoplastic resinous material, the glass fibers were determined to be uniformly distributed throughout.

A Hydraulic Press Manufacturing Company 300 ounce screw preplasticizing injection molding machine was equipped with a feed substantially as illustrated in FIG. 3, the feed adjusted to operate while the screw was rotating and provide a mixture of a copolymer of 70 percent by weight styrene and 30 percent by weight acrylonitrile and quarter inch chopped filamentary glass roving directly to the feed port. This material was provided at a rate of about 12 pounds per minute when the cylinder was being filled. The part being molded weighed 5½ pounds for an overall feed rate of about 330 pounds per hour of a mixture of 70 parts by weight polymer and 30 parts by weight glass. An examination of the molded part indicated that a highly satisfactory uniform dispersion of the chopped glass roving in the polymer was obtained.

In a manner similar to the foregoing illustrations, other particulate thermoplastic resins materials, including polystyrene, polypropylene, polyethylene, copolymers of styrene and methyl methacrylate were blended with glass fibers and molded into products having a substantially uniform distribution of glass fibers within the resinous matrix. Excellent shaped articles are prepared when blends of polymer are used instead of a single polymer compound. Mixtures of equal parts of polyvinyl chloride and a copolymer of 70 parts by weight styrene and 30 parts by weight acrylonitrile and ¼ inch glass fibers provide commensurate beneficial results. Modification of the above procedure by varying the ratio of the resinous and glass components resulted in products having a predetermined distribution of the fiber reinforcing agent throughout the molded product. Application of the hereinbefore described technique was eminently successful when applied to extrusion and compression molding.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method of fabricating a filament reinforced resinous object, the method comprising
   forming a thin layer of a finely divided granular synthetic extrudable polymeric resinous material which may be formed by the application of heat and pressure and a thin layer of a filamentary reinforcing agent having a fiber length of from about ¼ to about 1 inch,
   contacting the layers of resin and reinforcing agent,
   delivering the material of the layers to a heat fabricating apparatus, the apparatus having a barrel, a rotatable screw therein and a feed port, the material of the layers being delivered to the feed port, the materials being removed from the region of the feed port by the screw at a rate about equal to or greater than the rate of delivery thereto, thereby preventing significant stratification of the filamentary reinforcing agent and the granular resinous material,
   raising the temperature of the resinous material in the heat fabricating apparatus to a temperature sufficient to permit thermoplastic flow,
   mechanically admixing the resinous material with the reinforcing agent within the heat fabricating extrusion apparatus, the proportion of reinforcing agent and resinous material being such that the resultant mixture is in a heat plastified extrudable condition, and
   discharging the mixture to a mold having an enclosed mold configuration, and
   molding the mixture under pressure into a shaped article within the enclosed mold configuration.

2. A method of fabricating a filamentary reinforced shaped article, the method comprising,
   forming a thin layer of a finely divided granular thermoplastic polymeric resinous material,
   conveying a roving of a filamentary material to a comminuting device,
   comminuting the roving into a desired fiber length of about ¼ to about 1 inch and forming a thin layer of the resultant fibers,
   contacting the layers of thermoplastic resinous material and the comminuted reinforcing agent in a manner such that the layers are mutually coextensive subsequently,
   delivering the material of the coextensive layers directly to a heat fabricating extrusion apparatus, the apparatus having a barrel, a rotatable screw therein and a feed port, the material of the layers being delivered to the feed port, the material being removed from the region of the feed port by the screw at a rate about equal to or greater than the rate of delivery thereto, thereby preventing filamentary reinforcing agent and the granular resinous material from stratifying prior to heat plastification,
   raising the temperature of the resinous material within the heat fabricating apparatus to a heat fabricating temperature, the proportion of filamentary reinforcing material being such that the mixture is a heat plastified extrudable mass,
   mechanically admixing the reinforcing agent with the resinous material within the heat fabricating extrusion apparatus, and
   discharging the resultant mixture therefrom.

3. The method of claim 2 including the step of forming the shaped article by means of extrusion into the mold configuration.

4. The method of claim 2 including the step of forming the shaped article by means of injection molding.

5. The method of claim 2 wherein the filamentary material is glass fiber.

6. The method of claim 2 wherein the thermoplastic resinous material is polystyrene.

7. The method of claim 2 wherein the resinous material is a styrene-acrylonitrile copolymer.

8. A method of fabricating a filament reinforced resinous object, the method comprising
   combining (a) a stream of finely divided granular extrudable polymeric resinous material which may be formed by the application of heat and pressure with (b) a stream of a filamentary reinforcing agent having a fiber length from about ¼ to about 1 inch to form a composite stream wherein the filamentary agent and the resinous material are in close contact with each other, the proportion of reinforcing agent and resinous material being such that on heat plastification the mixture is extrudable,
   delivering the streams of resinous material and reinforcing agent to a heat fabricating apparatus, the apparatus having a barrel, a rotatable screw therein and a feed port, the resinous material and reinforcing agent being delivered to the feed port, the resinous material and reinforcing agent being removed from the region of the feed port by the screw at a rate about equal to or greater than the rate of delivery thereto, thereby preventing significant stratification of the resinous material and reinforcing agent prior to heat plastification,
   then heat plastifying the granular resinous material and mechanically mixing it with the filamentary reinforcing agent within a heat fabricating extrusion apparatus to form a heat plastified mixture, and
   discharging the heat plastified mixture to a mold having an enclosed mold configuration by means of pressure applied thereto.

9. The method of claim 8 wherein a stream of resinous material and a stream of filamentary reinforcing agent are caused to flow directly into the heating zone of a heat fabricating apparatus.

10. The method of claim 9 wherein a stream of resinous material is admixed with a stream of reinforcing agent while falling into the heat fabricating apparatus.

11. The method of claim 8 wherein the stream of resinous material and the stream of filamentary reinforcing agent are mechanically admixed prior to entering the heat fabrication apparatus.

12. A method for molding an article from a granular, heat pressure moldable synthetic resinous material and a filamentary reinforcing material, the method comprising
providing a stream of granular heat formable synthetic polymeric resinous material,
providing a stream of glass harl chopped into filaments of a desired length,
intermingling the stream of granular resinous materials with the stream of chopped harl to form a combined stream,
delivering the combined stream to a heat fabricating apparatus, the apparatus having a barrel, a rotatable screw therein and a feed port, the combined stream being delivered to the screw, the combined stream being removed from the region of the feed port by the screw at a rate about equal to or greater than the rate of delivery thereto, whereby the combined streams are prevented from significant stratification of the harl and resinous material,
heating the combined streams of harl and resinous material in a heat fabricating extrusion apparatus to a temperature which renders the synthetic resinous material thermoplastic, and
admixing the heat plastified resinous material with the harl within the heat fabricating extrusion apparatus, the proportion of filamentary reinforcing material and thermoplastic material being such that the mixture is an extrudable heat plastified mass, and subsequently
discharging the mixture into an enclosed mold configuration to form a shaped article.

13. The method of claim 12 wherein the granular resinous material passes a 40 mesh U.S. Sieve Size screen.

14. The method of claim 13 wherein the resinous material is retained on a 200 mesh U.S. Sieve Size screen.

15. A method of fabricating a filament reinforced resinous article, the method comprising
forming a thin layer of a finely divided granular synthetic extrudable resinous material selected from the group consisting of alkenyl aromatic resins, polyvinylchloride, vinylidene chloride copolymers, superpolyamides, polyolefins, ethyl cellulose and cellulose acetates, which may be formed by the application of heat and pressure and a thin layer of a filamentary reinforcing agent having a fiber length of from about ¼ to about 1 inch,
contacting the layers of resin and reinforcing agent,
delivering the layers to heat fabricating apparatus, the apparatus having a barrel, a rotatable screw therein and a feed port, the layers being delivered to the feed port, the material of the layers being removed from the region of the feed port by the screw at a rate about equal to or greater than the rate of delivery thereto, thereby preventing significant stratification of the filamentary reinforcing agent and the granular resinous material,
raising the temperature of the resinous material in the heat fabricating apparatus to a temperature sufficient to permit thermoplastic flow,
mechanically admixing the resinous material with the reinforcing agent within the heat fabricating extrusion apparatus, the proportion of reinforcing agent and resinous material being such that the resultant mixture is in a heat plastified extrudable condition,
discharging the mixture to a mold having an enclosed mold configuration, and
molding the mixture under pressure into a shaped article within the enclosed mold configuration.

16. A method of fabricating a filament reinforced shaped article, the method comprising
forming a thin layer of a finely divided granular thermoplastic resinous material selected from the group consisting of alkenyl aromatic resins, polyvinylchloride, vinylidene chloride copolymers, superpolyamides, polyolefins ethyl cellulose and cellulose acetates,
conveying a roving of a filamentary material to a comminuting device,
comminuting the roving into a desired fiber length of about ¼ to about 1 inch and forming a thin layer of the resultant fibers,
contacting the layers of thermoplastic resinous material and the comminuted reinforcing agent in a manner such that the layers are mutually coextensive, subsequently
delivering the coextensive layers directly to a heat fabricating apparatus, the apparatus having a barrel, a rotatable screw therein and a feed port, the material of the layers being delivered to the feed port, the materials being removed from the region of the feed port by the screw at a rate about equal to or greater than the rate of delivery thereto, whereby significant stratification of the resin and reinforcing agent adjacent the feed port is avoided,
raising the temperature of the thermoplastic resinous material to a heat fabricating temperature the proportion of filamentary reinforcing material and thermoplastic material being such that the mixture is a heat plastified extrudable mass,
mechanically admixing the reinforcing agent with the thermoplastic resinous material within the heat fabricating extrusion apparatus, and
discharging the resultant mixture to a mold, thereby molding a shaped article by means of pressure on the heat plastified mass within an enclosed mold configuration.

17. The method of claim 16 including the step of forming the shaped article by means of extrusion into the mold configuration.

18. The method of claim 16 including the step of forming the shaped article by means of injection molding.

19. The method of claim 16 wherein the filamentary material is glass fiber.

20. The method of claim 16 wherein the thermoplastic resinous material is polystyrene.

21. The method of claim 16 wherein the resinous material is a styrene-acrylonitrile copolymer.

22. A method of fabricating a filament reinforced resinous object, the method comprising
combining (a) a stream of finely divided extrudable granular resinous material selected from the group consisting of alkenyl aromatic resins, polyvinylchloride, vinylidene chloride copolymers, superpolyamides, polyolefins, ethyl cellulose and cellulose acetates, which may be formed by the application of heat and pressure with (b) a stream of a filamentary reinforcing agent having a fiber length from about ¼ to about 1 inch to form a composite stream wherein the filamentary agent and the resinous material are in close contact with each other, the proportion of reinforcing agent and resinous material being such that on heat plastification the mixture is extrudable,
delivering the composite stream to a heat fabricating apparatus, the apparatus having a barrel, a rotatable screw therein and a feed port, the composite stream being delivered to the screw at a location adjacent the feed port and the materials of the composite stream being removed from a region adjacent the feed port by the screw at a rate about equal to or greater than the rate of delivery thereto, thereby preventing stratification of the resinous material and reinforcing agent in the region of the feed port.

then heat plastifying the granular synthetic thermoplastic resinous material and mechanically mixing it with the filamentary reinforcing agent within a heat fabricating extrusion apparatus to form a heat plastified mixture, and discharging the heat plastified mixture to a mold having an enclosed mold configuration by means of pressure applied thereto.

23. The method of claim 22 wherein a stream of resinous material and a stream of filamentary reinforcing agent are caused to flow directly into the heating zone of a heat fabricating apparatus.

24. The method of claim 23 wherein a stream of resinous material is admixed with a stream of reinforcing agent while falling into the heat fabricating apparatus.

25. The method of claim 22 wherein the stream of resinous material and the stream of filamentary reinforcing agent are mechanically admixed prior to entering the heat fabrication apparatus.

26. A method for admixing a granular, heat pressure moldable synthetic resinous material selected from the group consisting of alkenyl aromatic resins, polyvinylchloride, vinylidene chloride copolymers, superpolyamides, polyolefins, ethyl cellulose and cellulose acetates, with a filamentary reinforcing material, the method comprising providing a stream of granular heat formable synthetic resinous material, providing a stream of glass harl chopped into filaments of a desired length, intermingling the stream of granular resinous materials with the stream of chopped harl to form a combined stream, delivering the materials of the combined stream to a heat fabricating apparatus, the apparatus having a barrel, a rotatable screw therein and a feed port, the combined stream being delivered to the screw in the region of the feed port, the materials of the combined stream being removed from the region of the feed port by the screw at a rate about equal to or greater than the rate of delivery thereto, whereby stratification of the harl and resinous materials in the region of the feed port is avoided, heating the combined streams of harl and resinous material in a heat fabricating extrusion apparatus to a temperature which renders the synthetic resinous material thermoplastic and admixing the heat plastified resinous material with the harl within the heat fabricating extrusion apparatus, the proportion of filamentary reinforcing material and thermoplastic material being such that the mixture is an extrudable heat plastified mass, and subsequently discharging the mixture into an enclosed mold configuration to form a shaped article.

27. The method of claim 26 wherein the granular resinous material passes a 40 mesh U.S. Sieve Size screen.

28. The method of claim 27 wherein the resinous material is retained on a 200 mesh U.S. Sieve Size screen.

References Cited

UNITED STATES PATENTS

| | | | |
|---|---|---|---|
| 2,527,628 | 10/1950 | Francis | 264—122 X |
| 2,790,741 | 4/1957 | Sonneborn et al. | 264—122 |
| 3,148,412 | 9/1964 | Spreeuwers | 18—125 H |
| 3,164,563 | 1/1965 | Maxwell et al. | 260—41 AG UX |
| 3,396,142 | 8/1968 | Little et al. | 260—41 AG |
| 2,540,146 | 2/1951 | Stober | 18—2 HA MX |
| 2,764,779 | 10/1956 | Zona | 18—2 HA UX |
| 2,997,205 | 8/1961 | Schuerger et al. | 18—12 SH UX |
| 3,022,210 | 2/1962 | Philipps | 260—41 AG X |
| 3,139,216 | 6/1964 | Mell | 222—55 |
| 3,155,750 | 11/1964 | Dahn et al. | 264—40 |
| 3,303,967 | 2/1967 | Munson | 222—55 X |
| 3,304,282 | 2/1967 | Cadus et al. | 264—349 X |
| 3,409,711 | 11/1968 | Pashak et al. | 264—349 X |
| 3,474,048 | 10/1969 | Chappelear et al. | 260—41 AG X |
| 3,520,027 | 7/1970 | Amos et al. | 264—329 X |
| 3,576,782 | 4/1971 | Molbert et al. | 260—41 AG |
| 3,577,494 | 5/1971 | Chisholm et al. | 264—349 X |
| 3,579,476 | 5/1971 | Rieke et al. | 260—41 AG |
| 3,584,095 | 6/1971 | Heider et al. | 264—349 X |

FOREIGN PATENTS

| | | | |
|---|---|---|---|
| 676,324 | 12/1963 | Canada | 260—41 AG |
| 618,094 | 2/1949 | Great Britain | 260—41 AG |

OTHER REFERENCES

Oleesky, Samuel S. and J. Gilbert Mohr: "SPI Handbook of Reinforced Plastics," New York, Reinhold, c1964, pp. 105–106.

Buslik, David, "Mixing and Sampling with Special Reference to Multi-Sized Granular Material." In ASTM Bulletin 165, April 1950, pp. 66–73.

Schlich, W. R.: "Critical Parameters for Direct Injection Molding of Glass-Fiber Thermoplastic Powder Blends." In SPE Journal, February 1968, vol. 24, pp. 43–53.

Bradt, Rexford: "How and Way to Use Glass-Reinforced Injection Molding Compounds." In Modern Plastics, March 1958, pp. 100–102, 192, 194.

Bernhardt, Ernest C. Ed.: "Processing of Thermoplastic Materials," New York, Reinhold: 1959, pp. 118–121, 123, 124, 126, 127, 131–133, 137, 138.

PHILIP E. ANDERSON, Primary Examiner

U.S. Cl. X.R.

222—1; 260—41 AG; 264—176, 211, 331, 349, DIG 53